3,457,839
BELLOWS ASSEMBLIES
Gerald F. Mills, Sunbury-on-Thames, England, assignor to The British Thermostat Company Limited, Sunbury-on-Thames, England
Filed Feb. 6, 1967, Ser. No. 614,324
Claims priority, application Great Britain, Mar. 24, 1966, 13,035/66
Int. Cl. F01b *19/04;* F16j *3/00;* B23p *19/04*
U.S. Cl. 92—34                                    4 Claims

ABSTRACT OF THE DISCLOSURE

In a thermostatic or like bellows assembly in which an end flange on the bellows is sandwiched between wall portions of a bellows plate and an inserted bush, the sandwich structure is deformed by a pressing or similar operation to effect a secure mechanical joint before sealing the joint by soldering.

---

This invention relates to bellows assemblies as used for example in thermostats and similar instruments and of the kind in which a metallic bellows element is supported at one end on a bellows plate, a capillary tube being connected to the interior of the bellows with the aid of an insert bush. The object of the present invention is to provide an improved method of and means for sealing an assembly of this character which avoids ingress of flux, flux residue, solder and other foreign matter to the bellows.

According to the invention the bellows element includes an end flange or extension which is sandwiched between concentric wall portions of the bellows plate and the insert bush, the sandwich structure thus formed being deformed by a pressing, staking or equivalent operation such as to effect a secure mechanical joint prior to the sealing of the joint by a soldering or similar operation. Preferably the end of the capillary tube is sealed within the insert bush in a similar manner, the bush including a portion adapted to be deformed to effect a tight mechanical joint with the capillary tube prior to solder or like sealing.

Figure 1:
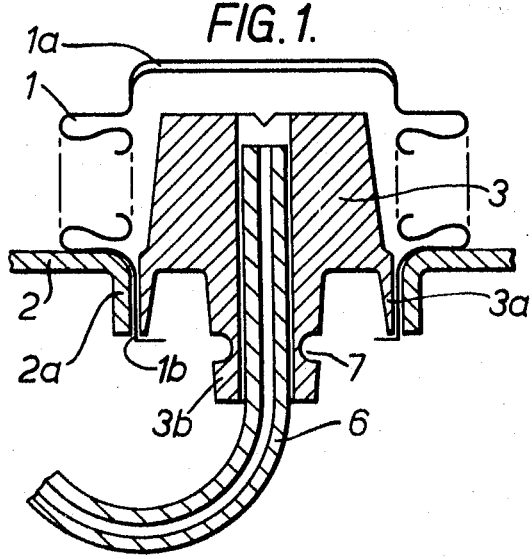
Figure 2:
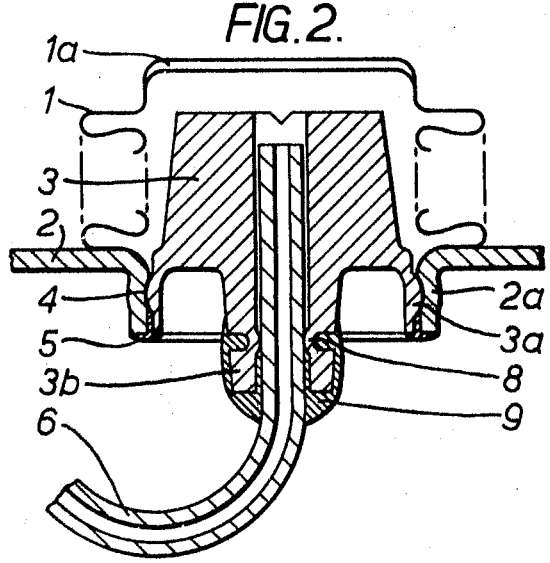

Reference will now be made to the accompanying drawings which illustrate a preferred embodiment of the invention and wherein:

FIG. 1 is a cross section through the initially assembled bellows structure, and FIG. 2 is a view similar to FIG. 1 but showing the assembly after the mechanical jointing and sealing operations.

In the drawings there is shown a bellows element 1 having an integral outer end wall 1*a* and formed at its rearward end with an axially extending flange 1*b*, the bellows plate 2 and the insert bush 3, which occupies a substantial portion of the interior of the bellows, being provided with concentrically-disposed rearwardly-directed walls or flanges 2*a*, 3*a* respectively between which the bellows flange 1*b* is located. By a staking, pressing or similar operation the sandwich structure thus formed is bulged, pressed up or otherwise deformed as indicated at 4 such that the several layers or components are mechanically locked together. The exposed end face of the joint is then sealed by a solder fillet 5, the deformation of the joint structure inward of its end preventing flux, solder or other matter entering the bellows and also resulting in a better and stronger joint.

The assembly is completed by a capillary tube 6 entering the bellows through an axial bore in the insert bush 3, the bushing including a tubular extension 3*b* which embraces the tube and which is slotted circumferentially or otherwise weakened as indicated at 7 such that it can be readily deformed to effect a secure mechanical joint with the tube as shown at 8. Here also a solder fillet 9 is subsequently applied to ensure a tight sealing of the bellows at this point, the bellows and capillary joints being preferably so arranged that they can be soldered or sealed in one operation, possibly by the "wave" soldering technique.

Capillary tube 6 in a manner well known and conventional in the art provides the usual passage for conducting fluid pressure or liquid into the interior of the bellows from a sensing element such as a temperature sensitive bulb or a pressure signal source.

I claim:

1. A bellows assembly comprising a tubular flexible bellows body having an annular extension at one end, a bellows end plate at said one end having an opening and an annular portion surrounding said opening, an insert bush disposed within said bellows body at said opening and having an annular portion projecting coextensively with said end plate portion to define an annular space therebetween within which said extension is disposed to provide an annular sandwich structure, said sandwich structure being deformed to provide a secure annular mechanical joint connection between said annular portions and the bellows extension, means providing a fluid tight seal of solidified plastic material in said space axially outwardly of said connection, said insert bush having a through bore opening into said bellows body, a capillary tube for connecting into the interior of said bellows body extending into said bore, said bush having a portion deformed to form a secure annular mechanical joint connection with said tube, and means providing a fluid tight seal of solidified plastic material in said bore axially outwardly of said joint connection between the capillary tube and insert bush.

2. In the bellows assembly defined in claim 1, said fluid tight seals both being soldered joints in the assembly.

3. In the bellows assembly defined in claim 1, said insert bush including a tubular extension through which said capillary tube passes, and the wall of said tubular extension being weakened so as to be deformed to provide said joint connection with said tube.

4. In the bellows assembly defined in claim 1, said annular end plate and insert bush portions comprising annular walls projecting away from said bellows body in closely adjacent relation to define said space.

References Cited

UNITED STATES PATENTS

| 904,123 | 11/1908 | Fulton | 92—34 |
|---|---|---|---|
| 1,615,591 | 1/1927 | Mallory | 29—454 |
| 1,703,037 | 2/1929 | Heck | 29—470.5 |
| 1,762,407 | 6/1930 | Mogford et al. | 29—470.5 |
| 1,801,498 | 4/1931 | Fulton et al. | 92—34 |

PAUL E. MASLOUSKY, Primary Examiner

U.S. Cl. X.R.
29—454, 470.5